United States Patent
Flores et al.

(10) Patent No.: US 8,125,569 B2
(45) Date of Patent: Feb. 28, 2012

(54) DYNAMIC CONTRAST ON DISPLAYS USING AVERAGE PICTURE LEVEL AND HISTOGRAM ANALYSIS

(75) Inventors: Emigdio Z Flores, Tijuana (MX); Mario Ramirez, Tijuana (MX); Juan Flores, Tijuana (MX); Eduardo Zuniga, Tijuana (MX)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 589 days.

(21) Appl. No.: 12/327,213

(22) Filed: Dec. 3, 2008

(65) Prior Publication Data

US 2010/0134689 A1 Jun. 3, 2010

(51) Int. Cl.
*H04N 5/14* (2006.01)
*H04N 5/202* (2006.01)
*H04N 5/52* (2006.01)

(52) U.S. Cl. ........ 348/672; 348/673; 348/674; 348/677; 348/689

(58) Field of Classification Search .................. 348/672, 348/673, 674, 677, 689
See application file for complete search history.

(56) References Cited

U.S. PATENT DOCUMENTS

| | | | |
|---|---|---|---|
| 5,257,108 A | 10/1993 | Muraoka | |
| 7,102,697 B2 * | 9/2006 | Lei et al. | 348/678 |
| 7,292,734 B2 | 11/2007 | Lee et al. | |
| 7,352,410 B2 * | 4/2008 | Chou | 348/673 |
| 7,839,455 B2 * | 11/2010 | Harada | 348/672 |
| 2004/0201562 A1 * | 10/2004 | Funamoto et al. | 345/89 |
| 2006/0061548 A1 * | 3/2006 | Kitaura | 345/156 |
| 2006/0061842 A1 | 3/2006 | Oka et al. | |
| 2007/0285577 A1 | 12/2007 | Harada | |
| 2008/0018561 A1 | 1/2008 | Song et al. | |
| 2008/0037866 A1 | 2/2008 | Na | |

* cited by examiner

*Primary Examiner* — Brian Yenke
(74) *Attorney, Agent, or Firm* — John L. Rogitz

(57) ABSTRACT

Average picture level (APL) of a display and, in examples, histogram information is used to dynamically adjust the display contrast, or "gamma", using an exponential function. APL can also be used for DC transmission adjustment and black/white stretch.

6 Claims, 2 Drawing Sheets

DYNAMIC CONTRAST ON DISPLAYS USING AVERAGE PICTURE LEVEL AND HISTOGRAM ANALYSIS

FIELD OF THE INVENTION

The present invention relates generally to dynamically change the contrast of video displays using average picture levels (APL) and histogram analysis.

BACKGROUND OF THE INVENTION

Video displays such as TV displays may allow users to define picture contrast and also may provide for automatic contrast improvement. As understood herein, such automatic contrast improvement preferably does not entail over-complicated processing, given that many display processors have limited processing capacity. As also understood herein however, improved automatic contrast control may be achieved by leveraging information that many if not most display systems such as TVs have available.

SUMMARY OF THE INVENTION

A display system includes a video display and processor circuitry receiving demanded image information and adjusting the demanded image information for output on the display. The processor circuitry obtains average picture level (APL) associated with the demanded image, and uses the APL to alter a intrinsic linear transfer curve associated with the demanded image. In addition, a histogram analysis is used to change dynamically the previous mentioned transfer curve. Also, the APL is used to alter a DC transmission characteristic associated with the demanded image as well as to alter the attenuation on black stretch and white stretch gain (inverted black and white compression effect) characteristic associated with the demanded image. In some embodiments the processor circuitry alters the original transfer curve, then alters the DC transmission characteristic, then alters the inverted black stretch and white stretch characteristic, in order.

In some implementations the processor circuitry can use histogram information associated with the demanded image to alter the transfer curve. The transfer curve can be dynamically altered using an exponential function. The exponential function can include a factor related to the APL and histogram analysis in terms of the distribution width and position of the majority of the pixel data. A specific exponential function can include a control factor of the form (gain plus (user-established dynamic gain factor)) multiplied by a gain from a histogram analysis. An even more specific exponential function can be of the form control_index$^{(gain(b)+rate(b))*bgain*index(APL)}$, where control_index is a pointer to every control point of the transfer curve which should be modified by the equation, gain(b) is a direct factor to a user-established control, rate(b) represents a linear relationship between APL and a received gain multiplied by a user-established dynamic gain factor, bgain is a dynamic factor provided by the histogram itself, which increases/decreases depending of the distribution's shape, and index (APL) is a parameter representative of a received APL. The previous equation defines the total black gain, which dynamically changes the exponential function with maximal value equal to APL. For defining the total white gain a similar equation is used. This can be of the form control_index$^{(1/(gain(w)+rate(w)))*wgain*(control\_index\_max-index(APL)))}$, where control_index_max is the maximal value of the transfer curve, for example 1023 in case of 10 bit based processing, gain(w) is a direct factor to a user-established control, rate(w) represents a linear relationship between APL and a received gain multiplied by a user-established dynamic gain factor, wgain is a dynamic factor provided by the histogram itself, which increases/decreases depending of the distribution's shape, and index(APL) is a parameter representative of a received APL.

In another aspect, a display system includes a display and a processor circuitry receiving an input signal representing a demanded image for the display and automatically altering a intrinsic transfer curve of the input by applying an S-shaped transfer function to the input to produce an output used by the display to present the demanded image.

In another aspect, a machine-implemented method contemplates receiving a demanded image for a visual display. An input contrast is associated with the demanded image. The method includes altering the input contrast using at least one exponential function to produce an output contrast and implementing the output contrast in the demanded image. The demanded image is then presented on the display.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
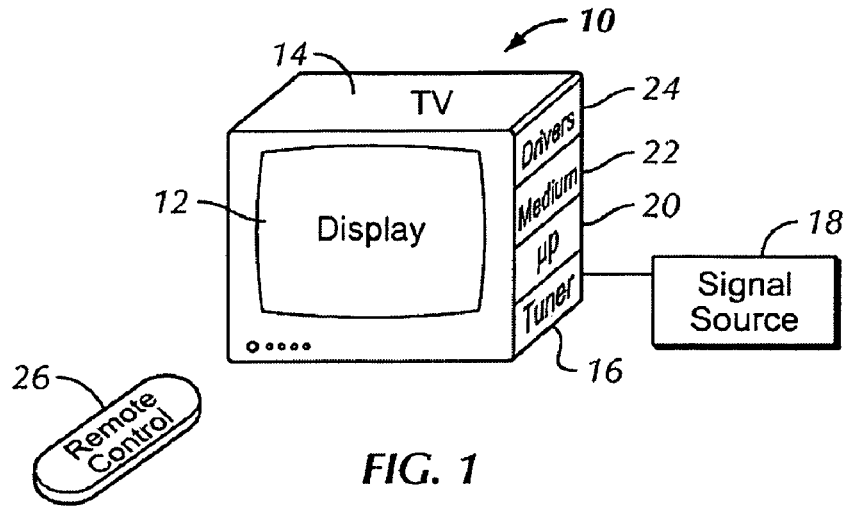
FIG. 1 is a schematic diagram of an example environment in which present principles can be used.

Referring initially to FIG. 1, a system 10 is shown for dynamically establishing a contrast, also referred to as a "gamma", in an image presented on a visual display 12. In the example embodiment shown the visual display 12 is a TV video display such as but not limited to a flat panel matrix-type display. The display 12 may alternatively be a computer monitor or a camera display or other visual display.

When the display 12 is implemented as a TV display, the system 10 includes a TV chassis 14 holding the display 12 and a TV tuner 16 receiving signals from a source 18 of TV programming such as a cable head end, set-top box, satellite receiver, terrestrial antenna, etc. The tuner 16 typically is mounted in the chassis 14 although in some embodiments the tuner 16 may be part of a set-top box.

The chassis 14 also typically holds a TV processor 20 that can access information, including a software implementation of present logic, on a tangible computer-readable storage medium 22 such as one or more disk storages, solid state storages, etc. When the display 12 is a matrix display it typically includes a display driver circuit 24 that can be implemented in one or more driver chips and that typically is controlled by the TV processor 20. The logic herein may be implemented in software for execution thereof by the processor 20, or it may be implemented in the driver circuit 24 alone or in concert with the processor 20. Accordingly, by "processor circuit" is meant the processor 20, the driver circuit 24, or a combination thereof. In any case, a remote control 26 may be used to input user commands to the TV including user-defined contrast settings.

Figure 2:
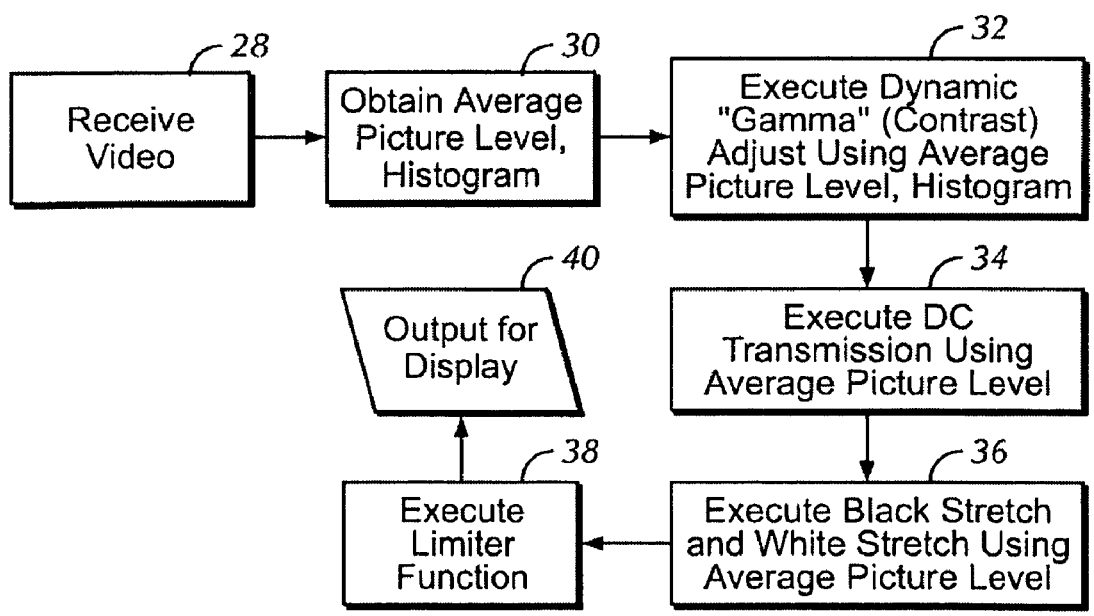
FIG. 2 is a flow chart of example overall logic that may employ present principles.

Now referring to FIG. 2, for each dynamic gain adjust period (e.g., every I-frame or every "n" frames or other suitable period), at block 28 a demanded image is received. At block 30, the average picture level (APL) of the demanded image is obtained by, e.g., adding every pixel level of the picture and dividing by the size of the picture. Also, histogram information pertaining to the demanded image is obtained by, e.g., analyzing the concurrence of the pixel levels. A histogram is a graphical representation of the tabulated frequencies of brightness levels in an image.

Proceeding to block 32, a dynamic gamma adjust is executed using the APL and histogram information to modify the contrast of the received demanded as described further below. Then, at block 34 a DC transmission adjustment is executed on the dynamically-adjusted demanded information using APL and after that, at block 36, APL is once again used to execute a black stretch and white stretch on the image. A limiter function may be executed at block 38, and then the adjusted signal output at state 40 for presentation on the display 12.

Figure 3:
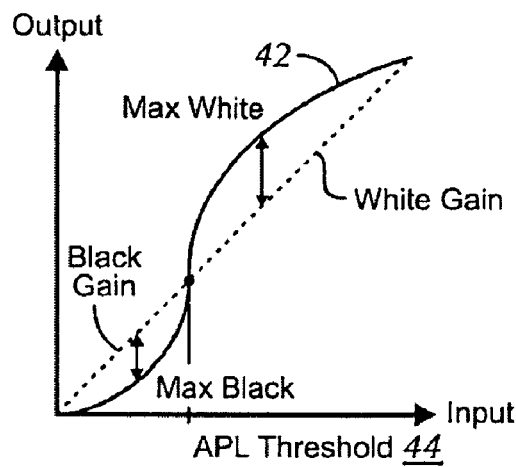
FIG. 3 is a graph illustrating example dynamic gamma adjust principles.

Details of an example implementation of the dynamic gamma adjust at block 32 are as follows. As shown in FIG. 3, an S-shaped transfer function 42 is applied to the input contrast to adjust the contrast. The inflection point of the "S" is the actual APL value of the image; below the APL level 44, a positive exponential function defines the transfer function and above the threshold 44 a negative exponential function defines the transfer function. The S-shaped transfer function advantageously increases the contrast between lower luminance pixels and higher luminance pixels.

In accordance with the embodiment of FIG. 3, if APL is relatively high, black gain is established to be relatively high by the transfer function and white gain is established to be relatively low, and if APL is relatively low, black gain is established to be relatively low and white gain is established to be relatively high. Histogram information associated with the input signal may also be used in the transfer function to establish the output. More specifically, the gain output of the transfer function may be inversely proportional to a width of a histogram range distribution of brightness levels. The width of the histogram can be divided in two sections, one from APL to first bin, and the other from APL to last bin. If the first section is very wide then a small black factor is generated, meaning that the picture has a wide distribution of pixel frequencies and a strong black gain is not required. If the same section has a narrow width then a strong factor is generated. Similar analysis is implemented for the second section, in which case white gain is affected.

In general, the positive and negative exponential functions mirror each other, with the factors of each function essentially being of the form (Gain+dynamic black [or white] gain) multiplied by a histogram gain. In a non-limiting example implementation, the positive exponential function used to establish the transfer function below the APL threshold is:

$\text{control\_index}^{(gain(b)+rate(b))*bgain*index(APL)}$, where control_index is a pointer to every control point of the transfer curve which should be modified by the equation, gain(b) is a direct factor to a user-established control, rate(b) represents a linear relationship between APL and a received gain multiplied by a user-established dynamic gain factor, bgain is a dynamic factor provided by the histogram itself, which increases/decreases depending of the distribution's shape, and index(APL) is a parameter representative of a received APL.

In contrast, the example non-limiting negative exponential function used to establish the transfer function above the APL threshold is:

$\text{control\_index}^{(1/(gain(w)+rate(w))*wgain*(control\_index\_max-index(APL)))}$, where control_index_max is the maximal value of the transfer curve, for example 1023 in case of 10 bit based processing, gain(w) is a direct factor to a user-established control, rate(w) represents a linear relationship between APL and a received gain multiplied by a user-established dynamic gain factor, wgain is a dynamic factor provided by the histogram itself, which increases/decreases depending of the distribution's shape, and index(APL) is a parameter representative of a received APL.

It is to be appreciated that histogram information used above defines where the most useful part of the image is, for area control. Knowing the width of the histogram distribution, the image can be separated into two parts with the APL threshold as the dividing point. If the first (lower) part is relatively wide, a large range of luminance information is contained in the demanded image, in which case the histogram information acts to reduce black gain. To do this a linear equation can be defined with maximal gain when distribution width is minimal (very narrow) and null gain when distribution width is maximal (e.g., 1023 for 10 bit resolution). On the other hand, if the first (lower) part is relatively narrow, a small range of luminance information is contained in the demanded image, in which case the histogram information acts to increase black gain. The same holds true for white gain in the negative exponential function; gain increase from the transfer function is inversely proportional to the width of the histogram range distribution of brightness levels.

Figure 4:
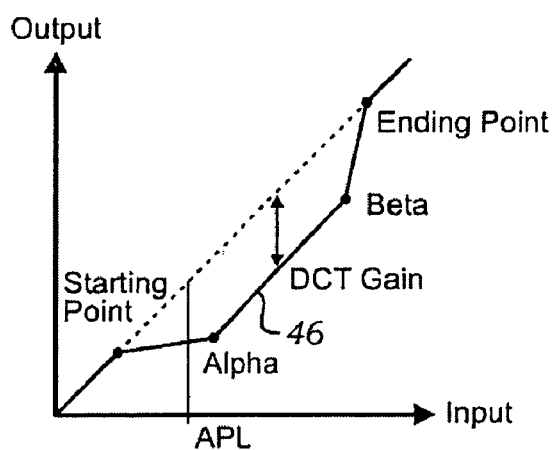
FIG. 4 is a graph illustrating example DC transmission adjust principles.

FIG. 4 shows the effects of the DC transmission step in block 34 of FIG. 2. As shown in FIG. 4, in the middle regions of APL a negative gain is produced in the shape of a trapezoidal curve 46 to increase the perceptual contrast over the entire image. The gain is changed in this step using APL, maximizing it in the middle of the luminance range when APL is at the middle. The slopes of the lines shown in FIG. 4 are derived in one example non-limiting embodiment as follows:

control_index=control_index-DCTgain, where control_index is a pointer to every control point of the transfer curve which should be modified by the equation, DCTgain is a gain factor multiplied by a direct user-established control. Here DCTgain has maximal effect when APL is in the middle of the luminance range. If APL is close to zero or maximal level (1023 for 10 bit) the DCTgain is equal to zero.

Figure 5:
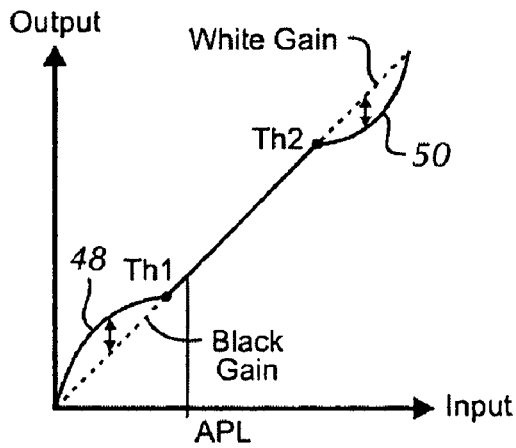
FIG. 5 is a graph illustrating example black stretch and white stretch principles.

FIG. 5 shows that the black/white stretch process of block 36 in FIG. 2 produces a black stretch curve 48 at lower luminance and a white stretch curve 50 at higher luminance levels to prevent black (or white) saturation from the operation of the prior two adjustments. Exponential functions that are essentially inverses of those discussed above for dynamic gamma adjust may be used. Two APL thresholds (labeled TH1 and TH2 in FIG. 5, respectively) are determined as follows, and then the exponential functions applied as shown from 0 to TH1 and from TH2 to the maximum luminance level:

$\text{control\_index}^{(1/gain(b)*index(APL))}$, where control_index is a pointer to every control point of the transfer curve which should be modified by the equation, gain(b) is a direct factor to a user-established control. This equation will be activated only when APL is below threshold 1 (Th1). If APL is above threshold 2 (Th2) then the following equation is needed:

$\text{control\_index}^{(gain(w)*control\_index\_max-index(APL))}$, where control_index_max is the maximal value of the transfer curve, gain(w) is a direct factor to a user-established control.

As mentioned above, a limiter function may be applied at the end of the above processes simply to limit the dynamic range. A simple limiter function can be to select a maximum gain if the adjusted gain from blocks 32-36 exceed some threshold, and likewise a minimum gain if the adjusted gain from blocks 32-36 fall below some threshold.

While the particular DYNAMIC CONTRAST ON DISPLAYS USING AVERAGE PICTURE LEVEL AND HISTOGRAM ANALYSIS is herein shown and described in detail, it is to be understood that the subject matter which is encompassed by the present invention is limited only by the claims.

What is claimed is:

1. Display system, comprising:
    video display;
    processor circuitry receiving demanded image information and adjusting the demanded image information for output on the display, the processor circuitry executing logic comprising:
        obtaining average picture level (APL) associated with the demanded image;
        using the APL to alter a gamma associated with the demanded image;
        using the APL to alter a DC transmission characteristic associated with the demanded image; and
        using the APL to alter a black stretch and white stretch characteristic associated with the demanded image, wherein the exponential function is control_index$^{(gain(b)+rate(b))*bgain*index(APL)}$ where control_index is a pointer to every control point of the transfer curve to be modified by the equation, gain(b) is a direct factor to a user-established control, rate(b) represents a linear relationship between APL and a received gain multiplied by a user-established dynamic gain factor, bgain is a dynamic factor provided by the histogram, and index(APL) is a parameter representative of a received APL.

2. The system of claim 1, wherein the processor circuitry alters the gamma, then alters the DC transmission characteristic, then alters the black stretch and white stretch characteristic.

3. The system of claim 1, wherein the processor circuitry uses histogram information associated with the demanded image to alter the gamma.

4. The system of claim 1, wherein the gamma is altered using an exponential function.

5. The system of claim 4, wherein the exponential function includes a factor related to the APL.

6. The system of claim 1 wherein the exponential function is control_index$^{(1/gain(w)+rate(w))*wgain*(control\_index\_max(APL))}$ where control_index_max is the maximal value of the transfer curve, gain(w) is a direct factor to a user-established control, rate(w) represents a linear relationship between APL and a received gain multiplied by a user-established dynamic gain factor, wgain is a dynamic factor provided by the histogram, and index(APL) is a parameter representative of a received APL.

* * * * *